(12) United States Patent
Shigematsu et al.

(10) Patent No.: US 8,771,857 B2
(45) Date of Patent: Jul. 8, 2014

(54) REDOX FLOW BATTERY

(75) Inventors: Toshio Shigematsu, Osaka (JP);
Yongrong Dong, Osaka (JP); Takahiro Kumamoto, Osaka (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 13/505,281

(22) PCT Filed: Apr. 27, 2011

(86) PCT No.: PCT/JP2011/060228
§ 371 (c)(1),
(2), (4) Date: May 1, 2012

(87) PCT Pub. No.: WO2011/136256
PCT Pub. Date: Nov. 3, 2011

(65) Prior Publication Data
US 2012/0244405 A1    Sep. 27, 2012

(30) Foreign Application Priority Data

Apr. 27, 2010 (JP) ................................. 2010-102747
Apr. 27, 2010 (JP) ................................. 2010-102748
Apr. 27, 2010 (JP) ................................. 2010-102749

(51) Int. Cl.
| | | |
|---|---|---|
| H01M 4/36 | (2006.01) |
| H01M 4/48 | (2010.01) |
| H01M 6/20 | (2006.01) |
| H01M 2/40 | (2006.01) |
| H01M 2/30 | (2006.01) |

(52) U.S. Cl.
CPC *H01M 2/40* (2013.01); *H01M 2/30* (2013.01); *H01M 2300/0088* (2013.01); *H01M 2300/0091* (2013.01)

USPC .......................................... 429/109; 429/105

(58) Field of Classification Search
None
See application file for complete search history.

(56) References Cited

U.S. PATENT DOCUMENTS

| | | |
|---|---|---|
| 4,362,791 A | 12/1982 | Kaneko et al. |
| 4,814,241 A | 3/1989 | Nagashima et al. |

(Continued)

FOREIGN PATENT DOCUMENTS

| | | |
|---|---|---|
| CN | 101593841 A | 12/2009 |
| CN | 101635363 A | 1/2010 |

(Continued)

OTHER PUBLICATIONS

International Search Report for PCT Application No. PCT/JP2011/060228 dated Jun. 7, 2011, pp. 1-4.

(Continued)

*Primary Examiner* — Zachary Best
*Assistant Examiner* — Jennifer Rea
(74) *Attorney, Agent, or Firm* — Ditthavong & Steiner, P.C.

(57) ABSTRACT

A redox flow (RF) battery performs charge and discharge by supplying a positive electrode electrolyte and a negative electrode electrolyte to a battery cell. Each of the positive electrode electrolyte and the negative electrode electrolyte contains a vanadium (V) ion as active material. At least one of the positive electrode electrolyte and the negative electrode electrolyte further contains another metal ion, for example, a metal ion such as a manganese ion that exhibits a higher redox potential than a V ion or a metal ion such as a chromium ion that exhibits a lower redox potential than a V ion.

8 Claims, 6 Drawing Sheets

(56) References Cited

U.S. PATENT DOCUMENTS

| | | | |
|---|---|---|---|
| 5,250,158 A | 10/1993 | Kaneko et al. | |
| 6,085,015 A * | 7/2000 | Armand et al. | 385/140 |
| 6,562,514 B1 * | 5/2003 | Kazacos et al. | 429/204 |
| 7,560,189 B2 | 7/2009 | Clarke et al. | |
| 2003/0143456 A1 | 7/2003 | Kazacos et al. | |
| 2005/0244707 A1 | 11/2005 | Skyllas-Kazacos et al. | |
| 2012/0115069 A1 | 5/2012 | Noack et al. | |

FOREIGN PATENT DOCUMENTS

| | | |
|---|---|---|
| EP | 0 517 217 A1 | 12/1992 |
| JP | 57-009073 A | 1/1982 |
| JP | 61-001270 U | 1/1986 |
| JP | 61-022574 A | 1/1986 |
| JP | 2-079374 A | 3/1990 |
| JP | 4-019966 A | 1/1992 |
| JP | 11-204124 A | 7/1999 |
| JP | 3143568 B2 | 3/2001 |
| JP | 2002-175831 A | 6/2002 |
| JP | 2003-157884 A | 5/2003 |
| JP | 2006-147374 A | 6/2006 |
| WO | WO 2008/009992 A2 | 1/2008 |
| WO | WO 2010/094657 A1 | 8/2010 |

OTHER PUBLICATIONS

Supplementary European Search Report for related European Patent Application No. 11 77 5037 dated Jan. 21, 2013, pp. 1-4.

Office Action for related U.S. Appl. No. 13/472,943, dated Oct. 16, 2012, pp. 1-23.

Office Action for corresponding Taiwanese Patent Application No. 101118964 dated Feb. 12, 2014, 8 pages.

L Joerissen et al., "Possible Use of Vanadium Redox-flow Batteries for Energy Storage in Small Grids and StandAlone Photovoltaic Systems", Journal of Power Sources, 2004, pp. 98-104, vol. 127.

Notification of First Office Action for corresponding Chinese Patent Application No. 201210254306.0 dated Feb. 20, 2014, 27 pages.

* cited by examiner

REDOX FLOW BATTERY

TECHNICAL FIELD

The present invention relates to a redox flow battery containing a vanadium ion as active material, and particularly to a redox flow battery capable of improving an energy density as compared to the conventional vanadium redox flow battery.

BACKGROUND ART

As a way to combat global warming, introduction of new energy such as solar photovoltaic power generation and wind power generation has been promoted in recent years throughout the world. Since outputs of such power generation are affected by the weather, it is predicted that introduction on a large scale will cause problems with operation of power systems such as difficulty in maintaining frequencies and voltages. As a way to solve such problems, installation of large-capacity storage batteries for smoothing output variations, storing surplus power, and load leveling is expected.

A redox flow battery is one of large-capacity storage batteries. In a redox flow battery, a positive electrode electrolyte and a negative electrode electrolyte are supplied to a battery cell having a membrane interposed between a positive electrode and a negative electrode, to charge and discharge the battery. An aqueous solution containing a water-soluble metal ion having a valence which changes by oxidation-reduction is representatively used as the electrolytes, and such a metal ion is used as active material. In recent years, the most widely studied type is a vanadium redox flow battery in which a vanadium (V) ion is used as active material for each of the positive electrode and the negative electrode (for example, Patent Literatures 1 and 2). The vanadium redox flow battery is currently put in practical use and expected to be continuously used in the future.

CITATION LIST

Patent Literature

PTL 1: Japanese Patent No. 3143568
PTL 2: Japanese Patent Laying-Open No. 2003-157884

SUMMARY OF INVENTION

Technical Problem

However, it is difficult for the conventional vanadium redox flow battery to achieve a further improvement in the energy density.

Generally, batteries are desired to have a higher energy density. In order to increase the energy density, for example, it is conceivable to raise the solubility of the active material in the electrolyte and to raise the utilization rate of the electrolyte, that is, the utilization rate of the metal ion contained as active material in the electrolyte. The above-described utilization rate means the actually available battery capacity (discharge capacity) with respect to the theoretical battery capacity (Ah) of the above-mentioned metal ion, that is, the difference between the battery capacity in the lower limit state of charge (SOC) and the battery capacity in the upper limit state of charge.

However, when the above-described utilization rate is raised as much as possible for charging, in other words, when the state of charge is increased, in the late stage of charge, the positive electrode undergoes a side reaction such as generation of oxygen resulting from water decomposition and deterioration of electrodes (particularly, made of carbon materials) while the negative electrode undergoes a side reaction such as generation of hydrogen resulting from water decomposition since an aqueous solution is utilized for an electrolyte as described above in the typical configuration of the redox flow battery.

The above-described side reactions bring about a lot of harmful effects such as (1) a current loss (a loss caused by the fact that a part of the quantity of electricity (Ah) used during charge is not used for a battery reaction (valence change) but is used for another reaction such as decomposition of water and the like) is caused to decrease the battery efficiency; (2) a difference between the states of charge of the positive and negative electrodes is caused, leading to a reduction in the available battery capacity; (3) deterioration of electrodes causes a shortened battery lifetime; and the like. Accordingly, when the battery is actually operated, the voltage at which charge is stopped (upper limit charge voltage) is determined so as to use the battery to such a degree that the above-described side reaction does not occur. For example, in order to suppress the above-described side reactions, Patent Literature 1 proposes that a pentavalent V ion in the positive active material is 90% or less at the end of charge while Patent Literature 2 proposes that charge is to be continued such that a divalent V ion in the negative active material is 94% or less.

However, the cell resistance is increased in the long-term use. Accordingly, when the voltage at which charge is to be stopped is set at a constant value without being changed from the beginning of its use, the cell resistance is increased, so that the state of charge at the start of its use cannot be maintained. Therefore, the voltage at which charge is stopped is to be increased over time in order to ensure a prescribed state of charge. Consequently, it becomes difficult to ensure a high state of charge without generating oxygen gas and hydrogen gas for a long period of time.

From the viewpoint of suppression of a side reaction, it is difficult in the current situation to keep the state of charge of a vanadium ion in the electrolyte at 90% or higher for a long period of time, and therefore, the vanadium ion cannot be sufficiently utilized. For that reason, in the conventional vanadium redox flow battery, it is difficult to achieve the utilization rate of the vanadium ion at 90% or higher, and still higher. Thus, an improvement in the energy density is limited.

An object of the present invention is to provide a redox flow battery that can improve an energy density.

Solution To Problem

In the conventional vanadium redox flow battery, only a vanadium ion is used as a metal ion serving as active material. On the other hand, the present inventors have surprisingly found that the utilization rate of a vanadium ion can be greatly improved as compared to the conventional vanadium redox flow battery, for example, by causing the electrolyte containing a vanadium ion as active material to contain metal ions such as a manganese (Mn) ion that is higher in oxidation-reduction potential (hereinafter simply referred to as potential) than the vanadium ion on the positive electrode side and a metal ion such as a chromium (Cr) ion that exhibits a lower redox potential than the vanadium ion on the negative electrode side, together with the vanadium ion. This is considered to result from the reasons described below.

In the redox flow battery using the electrolyte containing a vanadium ion as active material, the following reaction occurs in each electrode upon charging. The standard potentials at the time of occurrence of the reaction in each electrode are also shown.

Charge(positive electrode): $V^{4+} \rightarrow V^{5+} + e^-$ Potential: about 1.0V($V^{4+}/V^{5+}$)

Charge(negative electrode): $V^{3+} + e^- \rightarrow V^{2+}$ Potential: about $-0.26V(V^{3+}/V^{2+})$ Furthermore, the following side reaction may occur in the late stage of charge. Also shown in this case is the standard potential at the time of occurrence of each reaction when the electrode made of carbon material is utilized.

Charge (positive electrode):

$$H_2O \rightarrow (\tfrac{1}{2})O_2 + 2H^+ + 2e^-$$

Potential: about 1.2V (actual potential: about 2.0V)

$$C(\text{carbon}) + O_2 \rightarrow CO_2 + 4e^-$$

Potential: about 1.2V (actual potential: about 2.0V)

Charge (negative electrode):

$$H^+ + e^- \rightarrow (\tfrac{1}{2})H_2$$

Potential: about 0V (actual potential: about $-0.5V$)

In the actual operation, an overvoltage depending on the used electrode material is required, in which case the potential at the time of occurrence of the actual side reaction on the positive electrode side tends to be higher than the standard value. For example, when the electrode material is carbon material, the potential at the time of carbon reaction or water decomposition is about 2V, which is higher than about 1V that is the potential at the time of occurrence of battery reaction in the positive electrode. Therefore, an oxidation reaction of a vanadium ion ($V^{4+} \rightarrow V^{5+}$) mainly occurs in the positive electrode during charge as described above. However, when the charge voltages rises in the late stage of charge to cause the potential of the positive electrode to be relatively high, generation of oxygen gas and oxidation degradation of electrodes (carbon) may occur together with the above-described oxidation reaction of the vanadium ion. Furthermore, this side reaction also leads to deterioration of the battery characteristics.

Furthermore, in the actual operation, the potential at the time of occurrence of the actual side reaction on the negative electrode side tends to be lower than the standard value, depending on the used electrode material. For example, in the case where the electrode material is carbon material, a hydrogen overvoltage is relatively large, with the result that the potential at the time of generation of hydrogen is approximately $-0.5V$, which further exhibits a lower redox potential than approximately $-0.26V$ that is the potential at the time of occurrence of the battery reaction in the negative electrode. Therefore, during charge, a reduction reaction of the vanadium ion ($V^{3+} \rightarrow V^{2+}$) mainly occurs as described above in the negative electrode. However, when the charge voltage rises in the late stage of charge to cause the potential of the negative electrode to be relatively low, hydrogen gas may be generated simultaneously with the above-described reduction reaction of the vanadium ion.

In contrast, the following is the case where the positive electrode electrolyte contains, in addition to a vanadium ion, a metal ion higher in redox potential than a vanadium ion. For example, the potential of $Mn^{2+}/Mn^{3+}$ is approximately 1.5V, which is higher than the potential of $V^{4+}/V^{5+}$ (approximately 1.0V). In this case, however, this potential exists on the lower side with respect to the actual potential (approximately 2V) at the time of occurrence of a side reaction on the positive electrode side such as generation of oxygen gas resulting from water decomposition or electrode oxidation as described above. Accordingly, for example, when a divalent manganese ion ($Mn^{2+}$) is contained, an oxidation reaction of $Mn^{2+}$ is to first occur before occurrence of the side reaction on the positive electrode side such as generation of oxygen gas described above. In other words, in the late stage of charge, together with the oxidation reaction of $V^{4+}$ that is a main reaction of the battery, an oxidation reaction of $Mn^{2+}$ also occurs as a part of the battery reaction. The oxidation reaction of the metal ion different from the vanadium ion occurs, so that the above-described side reaction on the positive electrode side can be suppressed.

Alternatively, the following is the case where the negative electrode electrolyte contains, in addition to a vanadium ion, a metal ion lower in redox potential than the vanadium ion. For example, the potential of $Cr^{3+}/Cr^{2+}$ is approximately $-0.42V$ that is lower than the potential of $V^{3+}/V^{2+}$ (approximately $-0.26V$). In this case, however, this potential exists on the higher side with respect to the actual potential (approximately $-0.5V$) at the time of occurrence of the side reaction on the negative electrode side such as generation of hydrogen gas described above. Accordingly, for example, in the case where a trivalent chromium ion ($Cr^{3+}$) is contained, a reduction reaction of $Cr^{3+}$ is to first occur before occurrence of the above-described side reaction on the negative electrode side. In other words, in the late stage of charge, together with the reduction reaction of $V^{3+}$ that is a main reaction of the battery, reduction reaction of $Cr^{3+}$ also occurs as part of the battery reaction. The reduction reaction of the metal ion different from the vanadium ion occurs, so that the above-described side reaction on the negative electrode side can be suppressed.

As described above, in the case where the positive electrode electrolyte contains not only a vanadium ion but also a metal ion higher in redox potential than the vanadium ion, and in the case where the negative electrode electrolyte contains not only a vanadium ion but also a metal ion lower in redox potential than the vanadium ion, the above-described side reaction hardly occurs or substantially does not occur, for example, even when charge is performed such that the state of charge of the electrolyte in each of the positive electrode and the negative electrode exceeds 90%. Therefore, in the embodiment where the above-described metal ion is contained, it is considered that the vanadium ion in the electrolyte can be fully utilized repeatedly with stability as compared to the conventional vanadium redox flow battery. Thus, the utilization rate of the vanadium ion is enhanced in this way, thereby allowing improvement in the energy density. The present invention is based on the above-described findings.

The present invention relates to a redox flow battery performing charge and discharge by supplying a positive electrode electrolyte and a negative electrode electrolyte to a battery cell. Each of the positive electrode electrolyte and the negative electrode electrolyte contains a vanadium ion. Furthermore, at least one of the positive electrode electrolyte and the negative electrode electrolyte further contains at least one of a metal ion higher in redox potential than a vanadium ion and a metal ion lower in redox potential than the vanadium ion.

The redox flow battery according to the present invention having the above-described configuration allows suppression of the side reaction in the late stage of charge even when charge is performed until the state of charge of the electrolyte in at least one of the positive electrode and the negative electrode reaches nearly 100%. Specifically, for example, on the positive electrode side, oxidation of another metal ion (specifically, a metal ion higher in redox potential than a vanadium ion on the positive electrode side) contained together with a vanadium ion allows suppression of the side reaction such as generation of oxygen gas resulting from water decomposition and oxidation degradation of the electrode as described above. For example, on the negative electrode side, reduction of another metal ion (specifically, a metal ion lower in redox potential than a vanadium ion on the negative electrode side) contained together with a vanadium ion allows suppression of the side reaction such as generation of hydrogen gas as described above. Accordingly, as compared to the conventional redox flow battery that can only raise the state of charge to at most approximately 90% due to the side reaction occurring in the late stage of charge, the redox flow battery according to the present invention can raise the state of charge of the electrolyte in at least one of the electrodes to nearly 100%. The state of charge can be raised in this way, thereby allowing an increase in the utilization rate of the vanadium ion in the electrolyte. Accordingly, the redox flow battery according to the present invention can improve the energy density as compared to the conventional case.

Furthermore, since the redox flow battery according to the present invention can suppress the side reaction as described above, it can also effectively suppress various defects (decreased battery efficiency, decreased battery capacity, shortened lifetime) caused by the side reaction. Thus, since the redox flow battery according to the present invention is not only excellent in battery characteristics but also capable of increasing the durability, high reliability can be ensured for a long period of time.

Examples of a representative embodiment of the present invention will be described as follows. In each of the following embodiments, a metal ion higher in redox potential than a vanadium ion exists at least in the positive electrode electrolyte, and a metal ion lower in redox potential than a vanadium ion exists at least in the negative electrode electrolyte, so that the side reaction in the late stage of charge can be effectively suppressed as described above, thereby allowing an increase in the utilization rate of the vanadium ion.

(1) The embodiment in which at least the positive electrode electrolyte contains a vanadium ion and a metal ion higher in redox potential than the vanadium ion while the negative electrode electrolyte contains the vanadium ion.

(2) The embodiment in which each of the positive electrode electrolyte and the negative electrode electrolyte contains a vanadium ion and a metal ion higher in redox potential than the vanadium ion.

(3) The embodiment in which at least the positive electrode electrolyte contains a vanadium ion, a metal ion higher in redox potential than the vanadium ion and a metal ion lower in redox potential than the vanadium ion while the negative electrode electrolyte contains the vanadium ion.

(4) The embodiment in which at least the positive electrode electrolyte contains a vanadium ion, a metal ion higher in redox potential than the vanadium ion and a metal ion lower in redox potential than the vanadium ion while at least the negative electrode electrolyte contains a vanadium ion and a metal ion higher in redox potential than the vanadium ion.

(5) The embodiment in which the positive electrode electrolyte contains a vanadium ion while at least the negative electrode electrolyte contains a vanadium ion and a metal ion lower in redox potential than the vanadium ion.

(6) The embodiment in which each of the positive electrode electrolyte and the negative electrode electrolyte contains a vanadium ion and a metal ion lower in redox potential than the vanadium ion.

(7) The embodiment in which the positive electrode electrolyte contains a vanadium ion while at least the negative electrode electrolyte contains a vanadium ion, a metal ion higher in redox potential than the vanadium ion and a metal ion lower in redox potential than the vanadium ion.

(8) The embodiment in which at least the positive electrode electrolyte contains a vanadium ion and a metal ion lower in redox potential than the vanadium ion while at least the negative electrode electrolyte contains a vanadium ion, a metal ion higher in redox potential than the vanadium ion and a metal ion lower in redox potential than the vanadium ion.

Particularly, it is preferable to provide the embodiment in which at least the positive electrode electrolyte further contains a metal ion higher in redox potential than the vanadium ion while at least the negative electrode electrolyte further contains a metal ion lower in redox potential than the vanadium ion, since the side reaction in the late stage of charge described above is further effectively suppressed, thereby allowing a further increase in the utilization rate of the vanadium ion. This embodiment can also be configured such that the positive electrode electrolyte further contains a metal ion lower in redox potential than the vanadium ion or such that the negative electrode electrolyte further contains a metal ion higher in redox potential than the vanadium ion.

In addition, it becomes possible to provide the embodiment in which the electrolyte in each of the positive electrode and the negative electrode contains a vanadium ion, a metal ion higher in redox potential than the vanadium ion and a metal ion lower in redox potential than the vanadium ion, and representatively, the embodiment in which the electrolytes in both of the electrodes contain the same metal ion species. In the embodiment in which metal ion species in the both positive and negative electrode electrolytes are the same or partially the same, specific effects as described below may be achieved. Specifically, (1) the metal ion higher in redox potential in the positive electrode electrolyte and the metal ion lower in redox potential in the negative electrode electrolyte each move to a counter electrode, to cause a relative decrease in the metal ion essentially reacting on each electrode, so that it becomes possible to effectively avoid or suppress a decreased effect of suppressing the side reaction. (2) Even when liquid transfer occurs over time in accordance with charge/discharge (the phenomenon in which the electrolyte in one electrode moves to the other electrode) to cause variations in the amount of the electrolyte in each electrode, mixture of the electrolytes in both of the electrodes allows or facilitates the variations to be readily corrected. (3) Manufacturability of the electrolyte is excellent. In addition, in the embodiment in which the metal ion species are the same or partially the same, the metal ion higher in redox potential than the vanadium ion existing in the negative electrode electrolyte and the metal ion lower in redox potential than the vanadium ion existing in the positive electrode electrolyte exist mainly for the electrolytes in both of the electrodes to contain partially the same metal ion species, but do not actively act as active materials. Accordingly, the concentration of the metal ion higher in redox potential in the negative electrode electrolyte and the concentration of the metal ion higher in redox potential in the positive electrode electrolyte may be differently set, and the concentration of the metal ion lower in redox potential in the positive electrode electrolyte and the concentration of the metal ion lower in redox potential in the negative electrode electrolyte may be differently set. However, when these respective concentrations are equally set, the above-described effects (1) to (3) can be readily achieved.

It is preferable that the above-described metal ion higher in redox potential and the above-described metal ion lower in redox potential are water-soluble similarly to a vanadium ion or soluble in an acid aqueous solution. It is preferable that the metal ion higher in redox potential exists on the lower side than the actual potential (approximately 2V) at the time when a side reaction occurs on the positive electrode side. It is preferable that the metal ion lower in redox potential exists on the higher side than the actual potential (approximately −0.5V) at the time when a side reaction occurs on the negative electrode side.

Examples of the above-described metal ion higher in redox potential may include at least one type of metal ions, for example, selected from a manganese (Mn) ion, a lead (Pb) ion, a cerium (Ce) ion, and a cobalt (Co) ion. The standard potential of the above-described metal ions is $Mn^{2+}/Mn^{3+}$: approximately 1.5V, $Pb^{2+}/Pb^{4+}$: approximately 1.62V, $Pb^{2+}/PbO_2$: approximately 1.69V, $Ce^{3+}/Ce^{4+}$: approximately 1.7V, and $Co^{2+}/Co^{3+}$: approximately 1.82V. Thus, this potential is higher than the potential of the vanadium ion on the positive electrode side: $V^{4+}/V^{5+}$ (approximately 1.0V), and lower than the potential of the above-described side reaction on the positive electrode side (approximately 2V). In addition to a vanadium ion, the electrolyte in each of the positive electrode and the negative electrode may contain one type of the above-described higher potential metal ion or contain a plurality of types of combined higher potential metal ions having different potentials.

Examples of the above-described metal ion lower in redox potential may include at least one type of metal ions, for example, of a chromium ion and a zinc ion. The standard potential of chromium is $Cr^{3+}/Cr^{2+}$: approximately −0.42V, which is lower than the potential of the vanadium ion on the negative electrode side: $V^{3+}/V^{2+}$ (approximately −0.26V) and higher than the potential of the above-described side reaction on the negative electrode side (approximately −0.5V). On the other hand, the standard potential of zinc is $Zn^{2+}/Zn$ (metal): approximately −0.76V, which is lower than the potential of $V^{3+}/V^{2+}$ (approximately −0.26V) and lower than the potential of the above-described side reaction on the negative electrode side. However, zinc is sufficiently high in hydrogen overvoltage, and therefore, can cause a battery reaction. In addition to a vanadium ion, the electrolyte in each of the positive electrode and the negative electrode may contain one type of the above-described lower potential metal ion or contain a plurality of types of combined lower potential metal ions having different potentials.

As for the above-described metal ions, by utilizing such metal ions as allowing a reversible oxidation-reduction reaction and at least functioning as positive electrode active material or negative electrode active material, it becomes possible to decrease the amount of the vanadium ions practically required to store a prescribed electric power amount (kWh). Therefore, it is expected in this case that metal ions used as active material can be stabilized and supplied less expensively. The present inventors have found that $Mn^{3+}$ produced by oxidation reaction of $Mn^{2+}$ undergoes a reversible oxidation-reduction reaction in the sulfuric acid solution, that is, $Mn^{3+}$ oxidized during charge may be used during discharge for the discharge reaction of the battery ($Mn^{3+}+e^- \rightarrow Mn^{2+}$), and, in addition to a vanadium ion, a manganese ion can be repeatedly used as active material. Furthermore, among the above-described metal ions, a manganese ion is excellent in solubility. The above-described chromium ion and zinc ion undergo a reversible oxidation-reduction reaction in the sulfuric acid solution. Specifically, $Cr^{2+}$ and Zn (metal) reduced during charge are utilized during discharge for discharge reaction ($Cr^{2+} \rightarrow Cr^{3+}+e^-$, $Zn \rightarrow Zn^{2+}+2e^-$) of the battery and can be repeatedly used as active material. Therefore, it is preferable that the above-described higher potential metal ions contain a manganese ion while the above-described lower potential metal ions contain a chromium ion and a zinc ion.

When the manganese ion is contained as the above-described metal ion higher in redox potential, there may be a specific embodiment in which at least one type of a manganese ion of a divalent manganese ion and a trivalent manganese ion is contained. By containing one of the above-described manganese ion, the divalent manganese ion ($Mn^{2+}$) exists during discharge and the trivalent manganese ion ($Mn^{3+}$) exists during charge, leading to existence of both manganese ions through repeated charge and discharge.

In the case of the electrolyte containing the manganese ion as described above, it is considered that tetravalent manganese may exist depending on the state of charge in the actual operation. Therefore, as one embodiment according to the present invention, an electrolyte containing the above-described metal ions higher in redox potential contains at least one type of manganese ions of a divalent manganese ion and a trivalent manganese ion, and tetravalent manganese. In this case, $Mn^{3+}$ is unstable, which may cause a disproportionation reaction that produces $Mn^{2+}$ (divalent) and $MnO_2$ (tetravalent) in a manganese ion aqueous solution. As a result of the study by the present inventors, tetravalent manganese produced by the disproportionation reaction is considered to be $MnO_2$, but this $MnO_2$ is considered to be not entirely a solid precipitation but to exist in a stable state in which the $MnO_2$ seems to be at least partially dissolved in the electrolyte. This $MnO_2$ floating in the electrolyte can be used repeatedly by being reduced to $Mn^{2+}$ (discharged) through two-electron reaction during discharge, namely, by serving as active material, to contribute to increase in battery capacity. Accordingly, the present invention allows existence of tetravalent manganese. In addition, when it is desired to suppress precipitation of $MnO_2$ by the disproportionation reaction, for example, it is proposed that the operation is performed such that the state of charge of positive electrode manganese is not more than 90%, and preferably, equal to 70%, and the acid concentration (for example, the sulfuric acid concentration) of the electrolyte is increased when the solvent of the electrolyte is an acid aqueous solution.

In the case where a chromium ion is contained as the above-described metal ion lower in redox potential, as a more specific embodiment, at least one type of chromium ions of a divalent chromium ion and a trivalent chromium ion may be contained. By containing any one of the chromium ions described above, a trivalent chromium ion ($Cr^{3+}$) exists during discharge while a divalent chromium ion ($Cr^{2+}$) exists during charge, leading to existence of both chromium ions through repeated charge and discharge. Chromium is easily treated since it exists always as an ion in an aqueous solution with stability.

The present invention may include an embodiment where at least one of the total concentration of the metal ion higher in redox potential in the electrolyte containing the above-described metal ions higher in redox potential and the total concentration of the metal ion lower in redox potential in the electrolyte containing the above-described metal ions lower in redox potential is not less than 0.1M and not more than 5M (M is a mol concentration). More specifically, the present invention may include an embodiment where the total concentration of the metal ions higerh in redox potential is not less than 0.1M and not more than 5M when the positive electrode electrolyte contains the metal ion higher in redox potential; an embodiment where the total concentration of the metal ions lower in redox potential is not less than 0.1M and not more than 5M when the negative electrode electrolyte contains the metal ions lower in redox potential; and an embodiment where the total concentration of the metal ions higher in redox potential and the total concentration of the metal ions lower in redox potential each are not less than 0.1M and not more than 5M when the positive electrode electrolyte contains the metal ions higher in redox potential and the negative electrode electrolyte contains the metal ions lower in redox potential.

When the total concentration of each of the higher potential metal ions and the lower potential metal ions existing in the electrolyte of each of the positive electrode and the negative electrode is less than 0.1M, oxidation reaction and reduction reaction of the metal ions hardly occur, leading to difficulty in achieving the effect of suppressing the above-described side reaction by these oxidation reaction and reduction reaction. Consequently, it becomes difficult to sufficiently improve the energy density. The higher the total concentration of each of the above-described metal ions is, the greater the above-described effect of suppressing the side reaction is achieved and the more the energy density is improved. In this case, however, the solubility of the vanadium ion tends to decrease due to increased metal ions. When each total concentration of the above-described metal ions is not more than 1M, and further, not more than 0.5M, the effects of suppressing the above-described side reaction and the like can be achieved while the solubility of vanadium ion can also be sufficiently ensured. Furthermore, when the solvent of the electrolyte is an acid aqueous solution as described above and contains a manganese ion, the acid concentration of the electrolyte is increased to some extent, thereby allowing suppression of precipitation of $MnO_2$. In this case, however, the increased acid concentration may cause a decrease in the solubility of metal ions. Accordingly, the upper limit of the total concentration of the metal ions in each of the electrodes is considered to be 5M.

The present invention includes an embodiment where both the positive and negative electrode electrolytes contain a sulfate anion ($SO_4^{2-}$).

As for the solvent of the electrolyte in each of the positive electrode and the negative electrode, the aqueous solution containing at least one type of a sulfate anion ($SO_4^{2-}$), a phosphate anion ($PO_4^{3-}$) and a nitrate anion ($NO_3^-$) can be suitably utilized. These acid aqueous solutions can be expected to achieve several effects that (1) the stability, the reactivity and the solubility of the vanadium ion and the above-described metal ions in the electrolyte may be improved; (2) the ion conductivity is increased and the internal resistance of the battery is reduced, and (3) unlike when hydrochloric acid (HCl) is used, chlorine gas is not generated. Particularly, the embodiment where a sulfate anion ($SO_4^{2-}$) is contained is preferable since the stability and the reactivity of the vanadium ion and the above-described metal ions can be improved as compared to the case where a phosphate anion and a nitrate anion are contained. For the electrolyte in each of the above-described electrodes to contain a sulfate anion, for example, a sulfate salt containing a vanadium ion and the above-described metal ions may be used.

The present invention includes an embodiment where the solvent of each of the above-described positive and negative electrode electrolytes is an aqueous solution of $H_2SO_4$. In this case, it is preferable that the sulfuric acid concentration of the electrolyte in each of the positive electrode and the negative electrode is not more than 5M.

In addition to use of the sulfate salt as described above, an $H_2SO_4$ aqueous solution (sulfuric acid aqueous solution) is used as a solvent of the electrolyte, so that the stability and the reactivity of the vanadium ion and the metal ion can be improved while the internal resistance can also be reduced as described above. However, when the sulfuric acid concentration is too high, existence of the sulfate anion may lead to a decrease in the solubility of the vanadium ion and the metal ions such as a manganese ion and a chromium ion, and also lead to an increase in the viscosity of the electrolyte. Accordingly, the sulfuric acid concentration is preferably not more than 5M, in which case 1M to 4M can be readily available, and 1M to 3M is more preferable.

The present invention includes an embodiment where the operation is carried out such that at least one of the state of charge of the positive electrode electrolyte and the state of charge of the negative electrode electrolyte exceeds 90%. More specifically, it is preferable that the redox flow battery according to the present invention is operated such that the state of charge of the electrolyte of one of the positive electrode electrolyte and the negative electrode electrolyte containing at least one of the metal ions higher in redox potential and the metal ions lower in redox potential exceeds 90%.

In the present invention, in the state where the positive electrode electrolyte contains, in addition to a vanadium ion, a metal ion higher in redox potential than the vanadium ion and the state where the negative electrode electrolyte contains, in addition to a vanadium ion, a metal ion lower in redox potential than the vanadium ion, the side reaction can be suppressed as described above even when charge is performed such that the state of charge exceeds 90%. The state of charge is increased in this way, the utilization rate of the vanadium ion can be effectively raised. Particularly in the embodiment where the positive electrode electrolyte contains the above-described metal ions higher in redox potential and the negative electrode electrolyte contains the above-described metal ions lower in redox potential, the state of charge of each electrolyte in the positive electrode and the negative electrode is increased to exceed 90%. Thus, it is expected that the utilization rate of the vanadium ion can be more effectively increased.

Advantageous Effects of Invention

The redox flow battery according to the present invention can improve the energy density.

DESCRIPTION OF EMBODIMENTS

Figure 1:
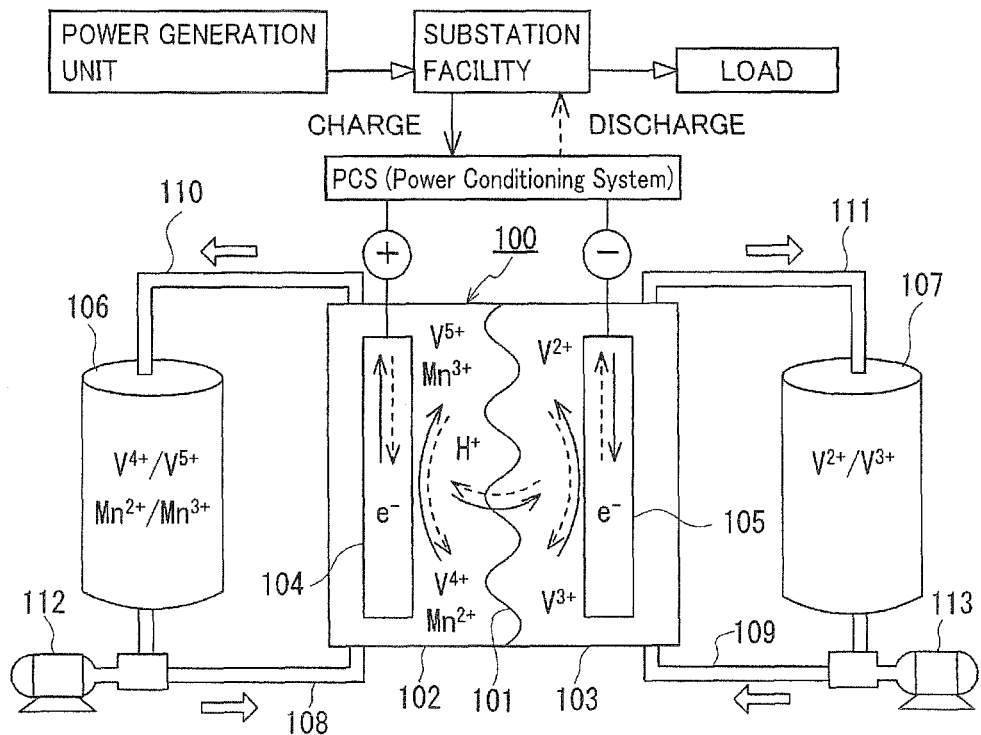
FIG. 1 illustrates the operating principles of a battery system including a redox flow battery according to the first embodiment.
Figure 2:
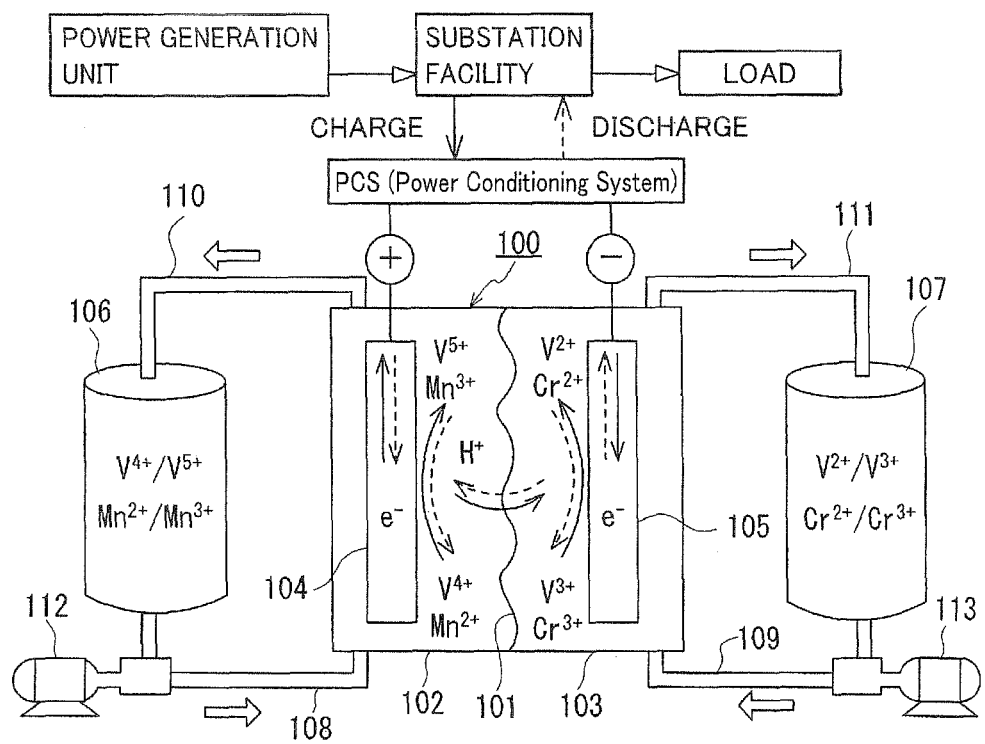
FIG. 2 illustrates the operating principles of a battery system including a redox flow battery according to the second embodiment.
Figure 3:
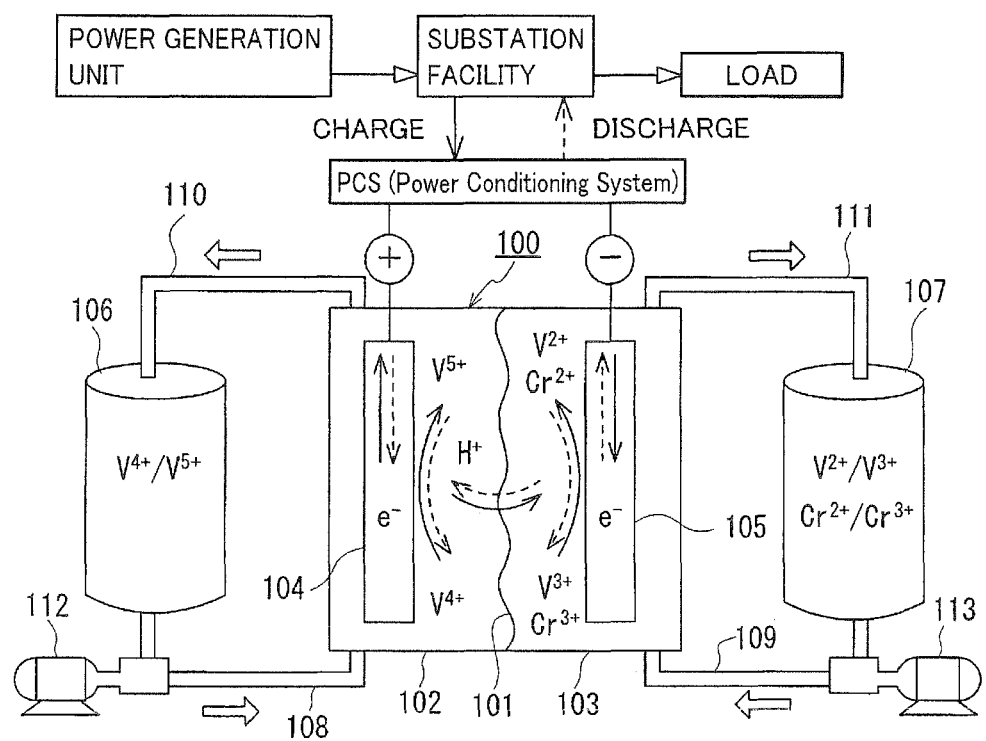
FIG. 3 illustrates the operating principles of a battery system including a redox flow battery according to the third embodiment.

Referring to FIGS. 1 to 3, battery systems including redox flow batteries according to the first to third embodiments will be hereinafter schematically described. In FIGS. 1 to 3, the same reference characters indicate components having the same names. Metal ions other than a vanadium ion shown in FIGS. 1 to 3 are merely illustrative examples. In FIGS. 1 to 3, a solid line arrow indicates charge, and a broken line arrow indicates discharge.

Redox flow batteries 100 according to the first to third embodiments have similar basic structures, which will be described with reference to FIG. 1. Redox flow battery 100 is representatively connected to a power generation unit (for example, a solar photovoltaic power generator, a wind power generator, or a common power plant) and to a load such as a power system or a consumer through a power conditioning system (PCS), charged by the power generation unit as a power supply source, and discharged to provide power to the load. To be charged and discharged, the following battery system including redox flow battery 100 and a circulation mechanism (tanks, pipes, pumps) for circulating an electrolyte through battery 100 is constructed.

Redox flow battery 100 includes a positive electrode cell 102 having a positive electrode 104 therein, a negative electrode cell 103 having a negative electrode 105 therein, and a membrane 101 separating cells 102 and 103 from each other, through which ions permeate as appropriate. Positive electrode cell 102 is connected to a tank 106 for a positive electrode electrolyte through pipes 108, 110. Negative electrode cell 103 is connected to a tank 107 for a negative electrode electrolyte through pipes 109, 111. Pipes 108, 109 include pumps 112, 113 for circulating the electrolytes of the electrodes, respectively. In redox flow battery 100, the positive electrode electrolyte in tank 106 and the negative electrode electrolyte in tank 107 are supplied to positive electrode cell 102 (positive electrode 104) and negative electrode cell 103 (negative electrode 105) through circulation, respectively, through pipes 108 to 111 and pumps 112, 113, to charge and discharge the battery through valence change reaction of the metal ion serving as active materials in the electrolytes of both electrodes.

Redox flow battery 100 representatively has a form referred to as a cell stack, which includes a plurality of cells 102, 103 stacked therein. Cells 102, 103 are representatively structured with a cell frame including a bipolar plate (not shown) having positive electrode 104 arranged on one surface and negative electrode 105 on the other surface, and a frame (not shown) having a liquid supply hole for supplying the electrolytes and a liquid drainage hole for draining the electrolytes, and formed on the periphery of the bipolar plate. By stacking a plurality of cell frames, the liquid supply holes and the liquid drainage holes form a fluid path for the electrolytes, which is connected to pipes 108 to 111 as appropriate. The cell stack is structured by successively and repeatedly stacking a set of the cell frame, positive electrode 104, membrane 101, negative electrode 105, and the cell frame. A known structure may be used as appropriate as a basic structure of the redox flow battery system.

In the redox flow battery according to the first embodiment, the above-described positive electrode electrolyte and the above-described negative electrode electrolyte each contain a vanadium ion, in which the positive electrode electrolyte contains, in addition to a vanadium ion, a metal ion higher in redox potential than the vanadium ion (FIG. 1 shows a manganese ion by way of example).

In the redox flow battery according to the second embodiment, the above-described positive electrode electrolyte and the above-described negative electrode electrolyte each contain a vanadium ion. The positive electrode electrolyte further contains, in addition to a vanadium ion, a metal ion higher in redox potential than the vanadium ion (FIG. 2 shows a manganese ion by way of example). The negative electrode electrolyte further contains, in addition to a vanadium ion, a metal ion lower in redox potential than the vanadium ion (FIG. 2 shows a chromium ion by way of example).

In the redox flow battery according to the third embodiment, the above-described positive electrode electrolyte and the above-described negative electrode electrolyte each contain a vanadium ion. In addition to a vanadium ion, the negative electrode electrolyte further contains a metal ion lower in redox potential than the vanadium ion (FIG. 3 shows a chromium ion by way of example).

A more specific explanation will be hereinafter made with reference to Experimental Examples. In each of Experimental Examples described below, the redox flow battery system shown in each of FIGS. 1 to 3 is structured as a basic configuration, in which various types of electrolytes containing a vanadium ion were prepared in each of the positive electrode and the negative electrode to perform charge and discharge on various conditions.

Experimental Example 1

The following was prepared as an example system according to the first embodiment.

(Electrolyte)

As a positive electrode electrolyte, 6 ml (6 cc) of an electrolyte having a vanadium ion (tetravalent) concentration of 1.65 M and a manganese ion (divalent) concentration of 0.5M was prepared by dissolving sulfate salts (vanadium sulfate (tetravalent) and manganese sulfate (divalent)) in the sulfuric acid aqueous solution having a sulfuric acid concentration ($H_2SO_4$aq) of 2.6M.

As a negative electrode electrolyte, 9 ml (9 cc) of an electrolyte having a vanadium ion (trivalent) concentration of 1.7M was prepared by dissolving sulfate salt (vanadium sulfate (trivalent)) in the sulfuric acid aqueous solution ($H_2SO_4$aq) having a sulfuric acid concentration of 1.75M. The amount of the negative electrode electrolyte is set to be greater than the amount of the positive electrode electrolyte, so that the battery reaction on the positive electrode side (including not only oxidation reaction of the vanadium ion but also oxidation reaction of the manganese ion) can be sufficiently caused during charge (which is the same in Experimental Example 2 described later).

(Other Components)

A carbon felt was used for each of the positive and negative electrodes, and an ion exchange membrane was used for the membrane. The constituent materials of the electrode and the membrane can be selected as appropriate. The electrode made of carbon felt have advantages of (1) hardly generating oxygen gas and hydrogen gas on the positive electrode side and the negative electrode side, respectively, (2) having a relatively large surface area, and (3) showing excellent circulation of the electrolyte. The ion exchange membranes have advantages of (1) attaining excellent isolation of the metal ions serving as active materials of each electrode, and (2) having excellent permeability of an $H^+$ ion (charge carrier inside a battery).

Figure 4:
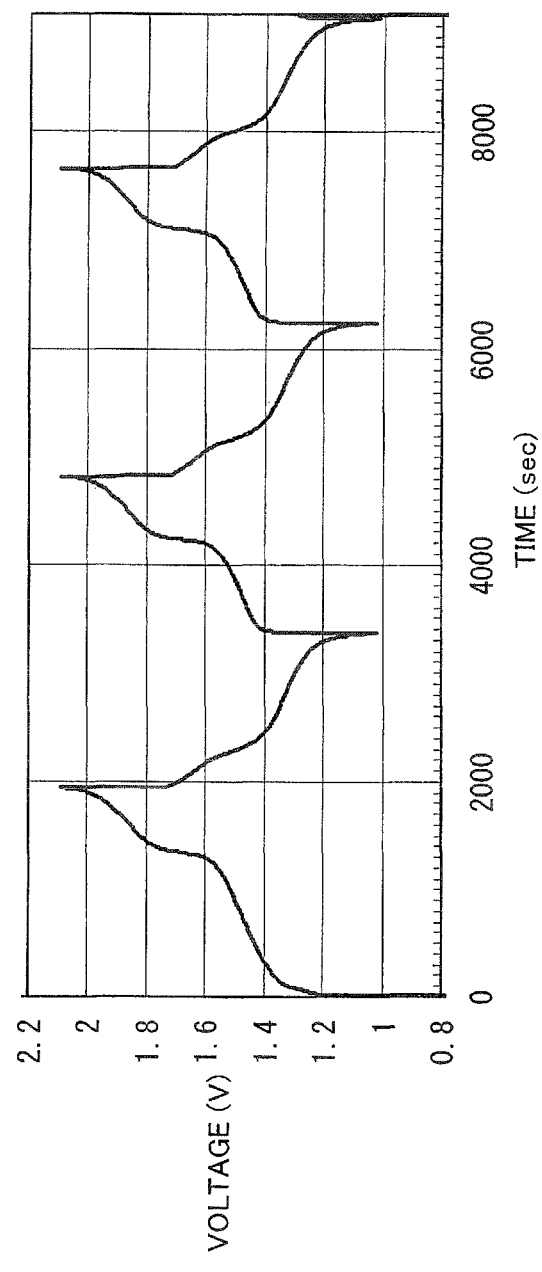
FIG. 4 shows a graph illustrating the relation between a cycle time (sec) of charge and discharge and a battery voltage (V) in an example system manufactured in Experimental Example 1.

Then, in this Experimental Example 1, a small single cell battery including an electrode having an area of 9 cm$^2$ was manufactured, and the prepared electrolyte for each of the above-described electrodes was used to perform charge at a constant current of 630 mA (current density: 70 mA/cm$^2$). More specifically, the battery was charged until the state of charge (SOC) of a vanadium ion in the positive electrode electrolyte reached 124%. The above-described state of charge shows the numerical value that is assumed to be set at 100 in the case where only a vanadium ion was used as active material. Thus, the state of charge exceeding 100% means that the state of charge of the vanadium ion is approximately 100% and Mn$^{2+}$ is changed to Mn$^{3+}$ (or tetravalent manganese) for charge. This charge was then switched to discharge, which was followed by repetition of charge and discharge on the same charge conditions as those described above. FIG. 4 shows the relation between the cycle time of charge and discharge and the battery voltage.

The vanadium redox flow battery system was constructed as comparison systems. The basic configuration of each of the comparison systems is the same as that of the above-described example system, and therefore, configured in the similar manner to the above-described example system except that the electrolyte and the operating conditions were different. In this Experimental Example 1, as a positive electrode electrolyte and a negative electrode electrolyte, the vanadium electrolyte having a vanadium ion (tetravalent) concentration of 1.7M in the positive electrode and a vanadium ion (trivalent) concentration of 1.7M in the negative electrode was prepared by dissolving vanadium sulfate (tetravalent) in the sulfuric acid aqueous solution (H$_2$SO$_4$aq) having a sulfuric acid concentration of 2.6M in the positive electrode and dissolving vanadium sulfate (trivalent) in the sulfuric acid aqueous solution (H$_2$SO$_4$aq) having a sulfuric acid concentration of 1.75M in the negative electrode.

Figure 6:
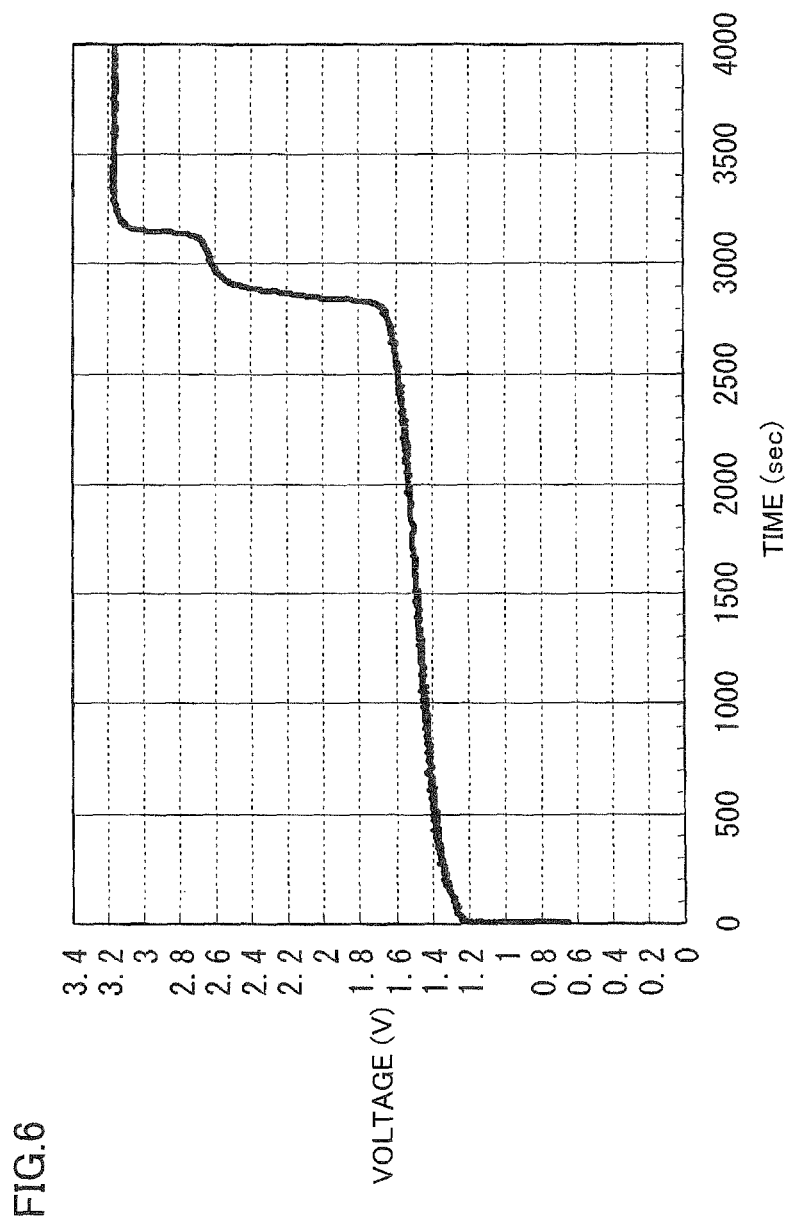
FIG. 6 shows a graph illustrating the relation between a charge time (sec) and a battery voltage (V) in a comparison system (I).

Then, in the comparison system (I), a small single cell battery including an electrode having an area of 9 cm$^2$ was manufactured. Then, the above-described vanadium electrolyte was used by 10 ml (10 cc) for each of the positive electrode and the negative electrode, to perform charge at a constant current of 540 mA (current density: 60 mA/cm$^2$). Furthermore, in the comparison system (I), even when the state of charge of the vanadium ion in the positive electrode electrolyte exceeded the level equivalent to 100%, charge was continued for a while. FIG. 6 shows the relation between the charge time and the battery voltage in the comparison system (I).

Figure 7:
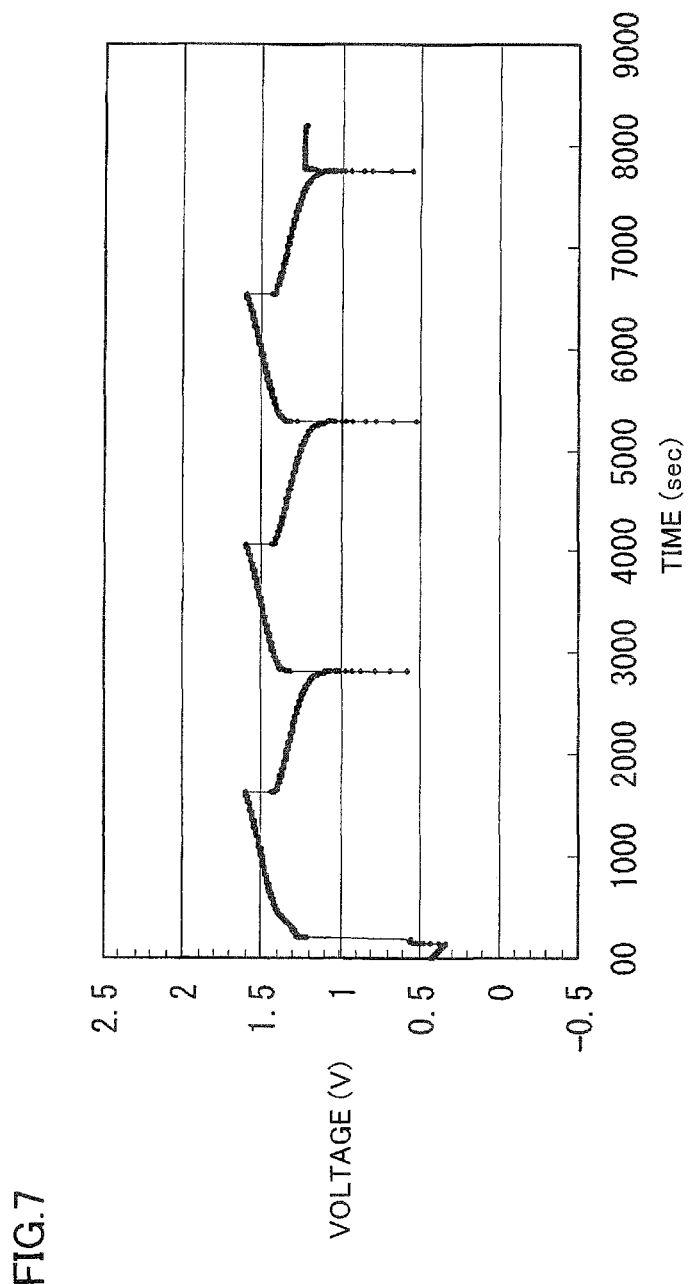
FIG. 7 shows a graph illustrating the relation between a cycle time (sec) of charge and discharge and a battery voltage (V) in a comparison system (II).

On the other hand, the comparison system (II) is configured in the similar manner to the above-described comparison system (I) except that the amount of the electrolyte and the operating conditions are different. Specifically, the above-described vanadium electrolyte was used by 7 ml (7 cc) for each of the positive electrode and the negative electrode, to perform charge at a constant current of 630 mA (current density: 70 mA/cm$^2$). Then, in the comparison system (II), charge was stopped and switched to discharge at the point of time when the voltage reached 1.6V (the state of charge of the vanadium ion: 78%). Then, charge and discharge were repeatedly performed in the similar manner. FIG. 7 shows the relation between the cycle time of charge and discharge and the battery voltage in the comparison system (II).

Consequently, in the comparison system (I), the voltage rapidly rose from around 1.6V to 2.6V or higher, as shown in FIG. 6. When charge was further continued, oxygen gas was generated from the positive electrode while hydrogen gas was generated from the negative electrode. When discharge was performed starting in such a state to further repeat charge and discharge several times on the similar conditions (charge was continued until the state of charge exceeded 100%), there was a tendency that the internal resistance of the battery was gradually increased and the battery capacity was also decreased. When the cell was disassembled after completion of the experiment, oxidation degradation of the carbon material constituting the positive electrode was recognized.

On the other hand, in the comparison system (II), when the upper limit voltage for charge was set at 1.6V, no generation of oxygen gas or hydrogen gas occurred. Furthermore, although charge and discharge were repeated several times, neither the internal resistance of the battery was increased nor the battery capacity was reduced. Thus, the operation could be repeatedly performed with stability. However, in the comparison system (II), the battery capacity that could be actually utilized is 20.4 minutes with respect to the theoretical capacity of 30.4 minutes (the value converted into discharge time based on the vanadium ion concentration of 1.7M, 7 ml, 630 mA) while the utilization rate of the vanadium ion is 67% (≤90%).

On the other hand, in the example system, although the voltage rises from around 1.6V as shown in FIG. 4, this voltage rise is not so sharp but relatively moderate as compared to the comparison system (I). It was also observed from the voltage characteristics after the voltage reached 1.6 V or higher that, during charge, further oxidation reaction of the vanadium ion occurred in the positive electrode while oxidation reaction of the manganese ion (divalent) occurred. Furthermore, unlike the comparison system (I), in the example system, even when charge was performed in the state where the state of charge of the positive electrode exceeded the level equivalent to 100%, a rise of the battery voltage was suppressed, and thus, at about 2V at most. In addition, in the example system, it was confirmed that oxygen gas was not generated and the electrode did not deteriorate when the cell was disassembled after repetition of charge and discharge. Furthermore, the discharge time (discharge capacity) of the example system was 23.7 minutes, which was 93.7% with respect to the theoretical capacity (25.3 minutes that is the value converted into discharge time based on the vanadium ion concentration of 1.65M, 6 ml, 630 mA), corresponding to the utilization rate exceeding 90%. Furthermore, it was also confirmed that even repetition of charge and discharge did not cause a reduction in the battery capacity and allowed a stable operation.

It can be said from the above-described Experimental Example 1 that when at least the positive electrode electrolyte contains, in addition to a vanadium ion, a metal ion higher in redox potential than the vanadium ion on the positive electrode side, the utilization rate of the vanadium ion can be effectively increased to improve the energy density.

Experimental Example 2

In Experimental Example 2, as a positive electrode electrolyte, 6 ml (6 cc) of an electrolyte having a vanadium ion (tetravalent) concentration of 1.65M and a manganese ion (divalent) concentration of 0.5M was prepared by dissolving sulfate salts (vanadium sulfate (tetravalent) and manganese sulfate (divalent)) in the sulfuric acid aqueous solution (H$_2$SO$_4$aq) having a sulfuric acid concentration of 2.6M. As a negative electrode electrolyte, 9 ml (9 cc) of an electrolyte having a vanadium ion (trivalent) concentration of 1.7M and a manganese ion (divalent) concentration of 0.5M was prepared by dissolving sulfate salts (vanadium sulfate (trivalent) and manganese sulfate (divalent)) in the sulfuric acid aqueous solution (H$_2$SO$_4$aq) having a sulfuric acid concentration of 1.65M. Other configurations were similar to those of the example system in Experimental Example 1.

Then, a small single cell battery (electrode area: 9 cm$^2$) similar to that of Experimental Example 1 was manufactured and the prepared electrolyte of each of the positive electrode and negative electrode was used to repeatedly perform charge and discharge on the conditions similar to those of the example system in Experimental Example 1. In this case, it was confirmed that the behavior of the voltage characteristics of the system in Experimental Example 2 was almost the same as that of the example system in Experimental Example 1 while the utilization rate could also be set to exceed 90%. Furthermore, it was confirmed also in the system in Experimental Example 2 that oxygen gas was not generated and the electrode did not deteriorate when the cell was disassembled after repetition of charge and discharge.

Therefore, it can be said from Experimental Example 2 that the utilization rate of the vanadium ion can be effectively raised to improve the energy density by the electrolyte in each of the positive and negative electrodes containing, in addition to a vanadium ion, a metal ion higher in redox potential than the vanadium ion on the positive electrode side.

Experimental Example 3

The following was prepared as an example system according to the second embodiment.

As a positive electrode electrolyte, 6 ml (6 cc) of an electrolyte having a vanadium ion (tetravalent) concentration of 1.65M, a manganese ion (divalent) concentration of 0.5M and a chromium ion (trivalent) concentration of 0.1M was prepared by dissolving sulfate salts (vanadium sulfate (tetravalent), manganese sulfate (divalent) and chromium sulfate (trivalent)) in the sulfuric acid aqueous solution ($H_2SO_4$aq) having a sulfuric acid concentration of 2.6M.

As a negative electrode electrolyte, 6 ml (6 cc) of an electrolyte having a vanadium ion (trivalent) concentration of 1.65M, a manganese ion (divalent) concentration of 0.5M and a chromium ion (trivalent) concentration of 0.1M was prepared by dissolving sulfate salts (vanadium sulfate (trivalent), manganese sulfate (divalent) and chromium sulfate (trivalent)) in the sulfuric acid aqueous solution ($H_2SO_4$aq) having a sulfuric acid concentration of 1.75M.

A carbon felt was used for each of the positive and negative electrodes, and an ion exchange membrane was used for the membrane.

Then, in this Experimental Example 3, a small single cell battery including an electrode having an area of 9 cm$^2$ was manufactured, and the above-described prepared electrolyte of each of the electrodes was used to perform charge at a constant current of 630 mA (current density: 70 mA/cm$^2$). More specifically, charge was performed until the state of charge (SOC) of the vanadium ion of the electrolyte in each electrode reached the level equivalent to 105%. The above-described state of charge shows a numerical value that is assumed to be set at 100 in the case where only a vanadium ion is used as active material. The state of charge exceeding 100% means that, in addition to the fact that the state of charge of the vanadium ion is approximately 100%, $Mn^{2+}$ is changed to $Mn^{3+}$ (or tetravalent manganese) for charge in the positive electrode while $Cr^{3+}$ is changed to $Cr^{2+}$ for charge in the negative electrode. This charge was then switched to discharge, which was followed by repetition of charge and discharge on the same charge conditions as those described above. The comparison system was configured as a comparison system (I) and a comparison system (II) in Experimental Example 1.

Consequently, in the example system according to the second embodiment, although the voltage rose from about 1.6V, this rise was not so sharp but relatively moderate as compared to the comparison system (I). It was also observed from the voltage characteristics after the voltage reached 1.6V or higher that, during charge, the positive electrode underwent further oxidation reaction of the vanadium ion and oxidation reaction of the manganese ion (divalent) while the negative electrode underwent further reduction reaction of the vanadium ion and reduction reaction of the chromium ion (trivalent). Furthermore, unlike the comparison system (I), in the example system of the second embodiment, even when charge was performed in the state where the state of charge of each electrode exceeded the level equivalent to 100%, a battery voltage rise was suppressed, and thus, at about 2V at most. In addition, in the example system according to the second embodiment, it was confirmed that oxygen gas or hydrogen gas was not generated while the electrode did not deteriorate when the cell was disassembled after repetition of charge and discharge. Then, it was also confirmed that the discharge time (discharge capacity) of the example system according to the second embodiment shows a utilization rate exceeding 90% with respect to the theoretical capacity (25.3 minutes that is a value converted into the discharge time based on the vanadium ion concentration of 1.65M, 6 ml, 630 mA). Furthermore, it was also confirmed that even repetition of charge and discharge did not cause a reduction in the battery capacity and allowed a stable operation.

It can be said from the above-described Experimental Example 3 that when at least the positive electrode electrolyte contains, in addition to a vanadium ion, a metal ion higher in redox potential than the vanadium ion on the positive electrode side and when at least the negative electrode electrolyte contains, in addition to a vanadium ion, a metal ion lower in redox potential than the vanadium ion on the negative electrode side, the utilization rate of the vanadium ion can be effectively increased to improve the energy density. Furthermore, it can be said that, in the above-described Experimental Example 3, the metal ion species in the electrolyte of each of the positive and negative electrodes are partially the same, with the result that (1) a relative decrease of the metal ions serving as active material hardly occurs, thereby allowing further suppression of occurrence of the side reaction; (2) variations in the liquid quantity resulting from liquid transfer can be readily corrected; and (3) the manufacturability of the electrolyte is excellent.

Experimental Example 4

The following was prepared as an example system according to the third embodiment.

As a positive electrode electrolyte, 9 ml (9 cc) of an electrolyte having a vanadium ion (tetravalent) concentration of 1.7M was prepared by dissolving sulfate salt (vanadium sulfate (tetravalent)) in the sulfuric acid aqueous solution ($H_2SO_4$aq) having a sulfuric acid concentration of 2.6M.

As a negative electrode electrolyte, 6 ml (6 cc) of an electrolyte having a vanadium ion (trivalent) concentration of 1.7M and a chromium ion (trivalent) concentration of 0.1M was prepared by dissolving sulfate salts (vanadium sulfate (trivalent) and chromium sulfate (trivalent)) in the sulfuric acid aqueous solution ($H_2SO_4$aq) having a sulfuric acid concentration of 1.75M. The amount of the positive electrode electrolyte is set to be greater than the amount of the negative electrode electrolyte, so that the battery reaction on the negative electrode side (including not only reduction reaction of the vanadium ion but also reduction reaction of the chromium ion) can be sufficiently caused during charge (which is the same in Experimental Example 5 described later).

A carbon felt was used for each of the positive and negative electrodes, and an ion exchange membrane was used for the membrane.

Figure 5:
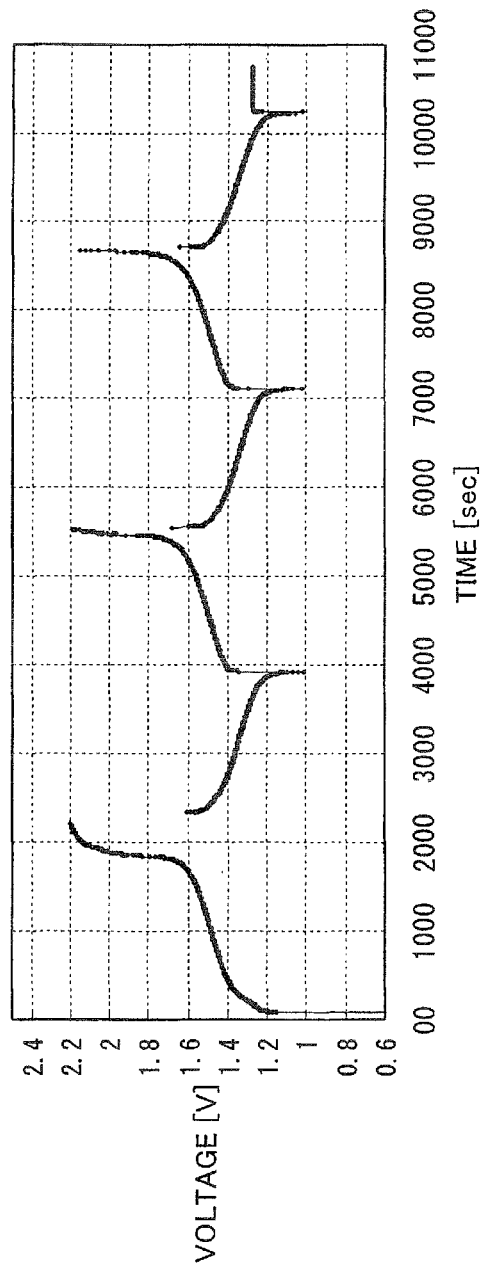
FIG. 5 shows a graph illustrating the relation between a cycle time (sec) of charge and discharge and a battery voltage (V) in an example system manufactured in Experimental Example 4.

Then, in this Experimental Example 4, a small single cell battery including an electrode having an area of 9 cm$^2$ was manufactured and the above-described prepared electrolyte in each of the electrodes was used to perform charge at a constant current of 630 mA (current density: 70 mA/cm$^2$). More specifically, charge was performed until the state of charge (SOC) of the vanadium ion in the negative electrode electrolyte reached the level equivalent to 109%. The above-described state of charge shows a numerical value that is assumed to be set at 100 in the case where only a vanadium ion was used as active material. Thus, the state of charge exceeding 100% means that the state of charge of the vanadium ion is approximately 100% and Cr$^{3+}$ is changed to Cr$^{2+}$ for charge. This charge was then switched to discharge, which was followed by repetition of charge and discharge on the same charge conditions as those described above. FIG. 5 shows the relation between the cycle time of charge and discharge and the battery voltage. The comparison system was configured as a comparison system (I) and a comparison system (II) of Experimental Example 1.

Consequently, in the example system according to the third embodiment, although the voltage rose from about 1.6V as shown in FIG. 5, this rise was not so sharp but relatively moderate as compared to the comparison system (I). It was also observed from the voltage characteristics after the voltage reached 1.6V or higher that, during charge, the negative electrode underwent further reduction reaction of the vanadium ion and reduction reaction of the chromium ion (trivalent). Furthermore, unlike the comparison system (I), in the example system according to the third embodiment, even when the charge was performed in the state where the state of charge of the negative electrode exceeded the level equivalent to 100%, a battery voltage rise was suppressed, and thus, at about 2V at most. In addition, no generation of hydrogen gas was observed in the example system according to the third embodiment. Then, the discharge time (discharge capacity) of the example system according to the third embodiment was 25.9 minutes corresponding to 99.6% with respect to the theoretical capacity (26 minutes which is a value converted into the discharge time based on the vanadium ion concentration of 1.75M, 6 ml, 630 mA). Thus, the capacity of nearly 100% was achieved and the utilization rate exceeding 90% was also achieved. Furthermore, it was also confirmed that even repetition of charge and discharge did not cause a reduction in the battery capacity and allowed a stable operation.

It can be said from the above-described Experimental Example 4 that the utilization rate of the vanadium ion can be effectively increased to improve the energy density by at least the negative electrode electrolyte containing, in addition to a vanadium ion, a metal ion lower in redox potential than the vanadium ion on the negative electrode side.

Experimental Example 5

In Experimental Example 5, the electrolyte containing a vanadium ion and a chromium ion was used as an electrolyte for each of the positive electrode and the negative electrode. Specifically, as a positive electrode electrolyte, sulfate salt (chromium sulfate (trivalent)) was further used in addition to the same materials as those in the example system of Experimental Example 4 to prepare 9 ml (9 cc) of an electrolyte having a vanadium ion (tetravalent) concentration of 1.7M and a chromium ion (trivalent) concentration of 0.1M. A negative electrode electrolyte similar to that in the example system of Experimental Example 4 was prepared (a vanadium ion (trivalent) concentration of 1.7M and a chromium ion (trivalent) concentration of 0.1M, 6 ml (6 cc)). Other configurations were the same as those in the example system of Experimental Example 4.

Then, a small single cell battery similar to that in Experimental Example 4 (an electrode area: 9 cm$^2$) was manufactured and the electrolyte in each of the prepared positive and negative electrodes was used, to perform charge until the state of charge of the vanadium ion reached the level equivalent to 110% at a constant current of 630 mA (current density: 70 mA/cm$^2$) in the similar manner to Experimental Example 4. Then, the behavior of the voltage characteristics of the system in Experimental Example 5 showed almost the same behavior as that of the example system in Experimental Example 4. Furthermore, the discharge time of the system in Experimental Example 5 was 25 minutes, which was 98% with respect to the theoretical capacity (26 minutes). Thus, it was confirmed that the battery capacity of nearly 100% was achieved and the utilization rate exceeding 90% could also be achieved. Furthermore, also in the system of Experimental Example 5, repetition of charge and discharge still allowed a stable operation and did not cause generation of hydrogen gas.

It can be said from Experimental Example 5 that the utilization rate of the vanadium ion can be effectively increased to improve the energy density also when the electrolyte in each of the positive and negative electrodes contains, in addition to a vanadium ion, a metal ion lower in redox potential than the vanadium ion on the negative electrode side.

The present invention is not limited to the above-described embodiments but can be modified as appropriate without deviation from the contents of the present invention. For example, the type and the concentration of the metal ion, the concentration of the solvent of the electrolyte, and the like can be changed as appropriate.

INDUSTRIAL APPLICABILITY

The redox flow battery according to the present invention can be suitably used as a large-capacity storage battery for stabilizing variations in power generation output, storing surplus generated power, and load leveling for power generation of new energy such as solar photovoltaic power generation and wind power generation. The redox flow battery according to the present invention can also be suitably used as a large-capacity storage battery attached to a common power plant for voltage sag and power failure prevention and for load leveling.

REFERENCE SIGNS LIST

100 redox flow battery, 101 membrane, 102 positive electrode cell, 103 negative electrode cell, 104 positive electrode, 105 negative electrode, 106 tank for positive electrode electrolyte, 107 tank for negative electrode electrolyte, 108, 109, 110, 111 pipe, 112, 113 pump.

The invention claimed is:

1. A redox flow battery performing charge and discharge by supplying a positive electrode electrolyte and a negative electrode electrolyte to a battery cell, each of said positive electrode electrolyte and said negative electrode electrolyte containing a vanadium ion, at least said positive electrode electrolyte further containing a divalent manganese ion higher in redox potential than the vanadium ion, and a total concentration of said divalent manganese ion being not less than 0.1M and not more than 0.5M.

2. The redox flow battery according to claim 1, wherein said negative electrode electrolyte further contains a metal ion higher in redox potential than the vanadium ion, and a total concentration of said divalent manganese ion in said positive electrode electrolyte and a total concentration of said metal ion in said negative electrode electrolyte each are not less than 0.1M and not more than 0.5M.

3. The redox flow battery according to claim 2, wherein said metal ion higher in redox potential is at least one type of metal ions selected from a manganese ion, a lead ion, a cerium ion, and a cobalt ion.

4. The redox flow battery according to claim 2, wherein said metal ion higher in redox potential is at least one type of manganese ions of a divalent manganese ion and a trivalent manganese ion.

5. The redox flow battery according to claim 2, wherein the electrolyte containing said metal ion higher in redox potential contains at least one type of manganese ions of a divalent manganese ion and a trivalent manganese ion, and tetravalent manganese.

6. The redox flow battery according to claim 1, wherein each of said positive electrode electrolyte and said negative electrode electrolyte contains a sulfate anion.

7. The redox flow battery according to claim 1, wherein
a solvent of each of said positive electrode electrolyte and said negative electrode electrolyte is an $H_2SO_4$ aqueous solution, and
a sulfuric acid concentration of each of said positive electrode electrolyte and
said negative electrode electrolyte is not more than 5M.

8. The redox flow battery according to claim 1, wherein said redox flow battery is operated such that a state of charge of said positive electrode electrolyte exceeds 90%.

* * * * *